United States Patent
Hennon

(10) Patent No.: US 10,443,644 B2
(45) Date of Patent: Oct. 15, 2019

(54) ANCHOR SEALING HYGIENIC BRACKET

(71) Applicant: John Hennon, Wall, NJ (US)

(72) Inventor: John Hennon, Wall, NJ (US)

(73) Assignee: SYNTIRO DYNAMICS LLC, Wall, NJ (US)

( * ) Notice: Subject to any disclaimer, the term of this patent is extended or adjusted under 35 U.S.C. 154(b) by 44 days.

(21) Appl. No.: 15/785,735

(22) Filed: Oct. 17, 2017

(65) Prior Publication Data

US 2018/0038518 A1     Feb. 8, 2018

Related U.S. Application Data

(63) Continuation-in-part of application No. 14/998,664, filed on Jan. 29, 2016, now Pat. No. 9,822,907.
(Continued)

(51) Int. Cl.
| | |
|---|---|
| *F16B 33/00* | (2006.01) |
| *F16L 3/11* | (2006.01) |
| *F16L 3/10* | (2006.01) |
| *F16M 13/02* | (2006.01) |
| *F16L 3/22* | (2006.01) |

(Continued)

(52) U.S. Cl.
CPC .......... *F16B 33/004* (2013.01); *F16L 3/1083* (2013.01); *F16L 3/1091* (2013.01); *F16L 3/11* (2013.01); *F16M 13/02* (2013.01); *F16M 13/027* (2013.01); *F16B 13/04* (2013.01); *F16B 13/061* (2013.01); *F16B 23/0084* (2013.01); *F16B 37/145* (2013.01); *F16B 43/001* (2013.01); *F16L 3/133* (2013.01); *F16L 3/22* (2013.01); *F16L 3/221* (2013.01); *F16L 3/223* (2013.01)

(58) Field of Classification Search
CPC ..... F16L 3/11; F16L 3/22; F16L 3/221; F16L 3/222; F16L 3/133; F16L 3/223; F16B 43/001; F16B 33/004; F16B 13/04; F16B 37/145; F16B 23/0084; F16M 13/027
USPC .................................................. 411/178, 179
See application file for complete search history.

(56) References Cited

U.S. PATENT DOCUMENTS

| | | | | |
|---|---|---|---|---|
| 1,462,187 A | * | 7/1923 | Zifferer | F16L 3/133 248/58 |
| 1,477,621 A | * | 12/1923 | Zifferer | F16L 3/133 248/59 |

(Continued)

*Primary Examiner* — Eret C McNichols
(74) *Attorney, Agent, or Firm* — Z IP Law PLLC

(57) ABSTRACT

A hygienically sealable anchor bracket for installation of block style tube and pipe hangers to a ceiling, wall, floor, equipment frame, or other paneled strata in which there may be no access to the reverse side, there being a need to secure the anchor bracket to an attachment fastener or toggle bolt and simultaneously shield the exposed fastener or toggle bolt structure from the environment of the clean room, sterile room, or sanitary room in order to protect the irregular surface of the fastener or toggle bolt from caustic cleaning solutions and to prevent the buildup of dirt and bacteria, the anchor bracket having a pedestal in communication with the cavity which encapsulates the exposed portion of the toggle bolt and secures the anchor bracket thereto, the anchor bracket having a plurality of receptacles for receipt of fasteners utilized in assembling block style tube and pipe hangers, thus securing the block style tube and pipe hanger and anchor bracket to the ceiling, wall, floor, equipment frame, or other paneled strata.

15 Claims, 15 Drawing Sheets

Related U.S. Application Data

(60) Provisional application No. 62/176,041, filed on Feb. 9, 2015.

(51) Int. Cl.
*F16L 3/223* (2006.01)
*F16B 13/04* (2006.01)
*F16B 23/00* (2006.01)
*F16B 37/14* (2006.01)
*F16L 3/133* (2006.01)
*F16B 13/06* (2006.01)
*F16B 43/00* (2006.01)

(56) References Cited

U.S. PATENT DOCUMENTS

| | | | | |
|---|---|---|---|---|
| 2,156,639 A * | 5/1939 | Powell | ............. | F16L 3/11 248/59 |
| 2,925,977 A * | 2/1960 | Cononi | ............. | F16L 3/133 248/62 |
| 3,191,730 A * | 6/1965 | Fischer | ............. | F16B 33/004 411/542 |
| 3,201,906 A * | 8/1965 | Giardina | ............. | E04B 9/18 248/58 |
| 3,216,683 A * | 11/1965 | Girard | ............. | F16L 3/222 248/68.1 |
| 4,442,990 A * | 4/1984 | Krueger | ............. | F16L 3/222 248/62 |
| 4,744,187 A * | 5/1988 | Tripp | ............. | E04D 5/143 411/179 |
| 5,205,692 A * | 4/1993 | Kelbert | ............. | F16B 5/0216 411/173 |
| 5,346,169 A * | 9/1994 | Polonsky | ............. | A47G 1/20 248/224.7 |
| 5,887,832 A * | 3/1999 | Elvegaard | ............. | F16L 3/22 248/68.1 |
| 5,921,509 A * | 7/1999 | Flood | ............. | F16L 3/222 248/58 |
| 5,996,945 A * | 12/1999 | Coles | ............. | F16L 3/2235 24/16 R |
| 6,173,926 B1 * | 1/2001 | Elvegaard | ............. | F16L 3/1075 248/68.1 |
| 6,361,258 B1 * | 3/2002 | Heesch | ............. | F16B 23/0084 411/178 |
| 7,229,057 B2 * | 6/2007 | Cavell | ............. | A47G 25/06 211/115 |
| 7,475,513 B2 * | 1/2009 | Parker | ............. | F16L 3/1091 248/49 |
| 7,543,606 B2 * | 6/2009 | Friedline | ............. | F16L 3/085 138/106 |
| D614,947 S * | 5/2010 | Hennon | ............. | D8/380 |
| 7,922,433 B2 * | 4/2011 | Ricciardo | ............. | F16B 39/10 411/119 |
| 7,985,040 B2 * | 7/2011 | Cao | ............. | F16B 35/041 411/178 |
| 8,122,648 B1 * | 2/2012 | Liu | ............. | F24S 25/61 52/58 |
| 8,136,311 B2 * | 3/2012 | Liu | ............. | H02S 20/25 52/173.3 |
| 8,226,052 B2 * | 7/2012 | Hancock | ............. | F16L 59/135 248/61 |
| 8,448,405 B2 * | 5/2013 | Schaefer | ............. | E04C 3/06 52/710 |
| 8,448,407 B1 * | 5/2013 | Wiener | ............. | F24S 25/61 52/745.21 |
| 8,475,103 B2 * | 7/2013 | Michalski | ............. | F16B 43/001 411/369 |
| 8,596,589 B2 * | 12/2013 | Hennon | ............. | F16L 3/222 248/65 |
| 8,628,286 B2 * | 1/2014 | Duvekot | ............. | E04B 1/66 411/369 |
| 8,631,629 B1 * | 1/2014 | Wiener | ............. | F16B 5/0275 52/745.21 |
| 8,776,456 B1 * | 7/2014 | Schrock | ............. | H02S 20/00 52/173.3 |
| 8,944,388 B2 * | 2/2015 | Magno, Jr. | ............. | F16L 33/24 248/56 |
| 9,033,289 B2 * | 5/2015 | Hennon | ............. | F16L 3/222 248/65 |
| 9,038,968 B2 * | 5/2015 | Hennon | ............. | F16L 3/1091 248/65 |
| 9,046,198 B2 * | 6/2015 | Mongiorgi | ............. | F16L 3/2235 |
| 9,188,144 B2 * | 11/2015 | Sano | ............. | F16B 19/1045 |
| 9,199,830 B2 * | 12/2015 | O'Brien | ............. | B66F 3/08 |
| 9,273,683 B2 * | 3/2016 | Yokoi | ............. | B60H 1/00514 |
| 10,008,974 B2 * | 6/2018 | Tomlinson | ............. | H02S 20/00 |
| 10,211,773 B2 * | 2/2019 | Jasmin | ............. | H02S 20/23 |
| 2002/0136595 A1 * | 9/2002 | Schubring | ............. | F16B 5/0275 403/296 |
| 2003/0177706 A1 * | 9/2003 | Ullman | ............. | E04D 13/12 52/3 |
| 2006/0048611 A1 * | 3/2006 | Berdin | ............. | B25B 27/0007 81/121.1 |
| 2006/0072979 A1 * | 4/2006 | McDuff | ............. | F16B 13/061 411/38 |
| 2006/0086765 A1 * | 4/2006 | Harberts | ............. | F16J 15/025 224/309 |
| 2006/0186278 A1 * | 8/2006 | Tjerrild | ............. | F16L 3/133 248/65 |
| 2006/0249636 A1 * | 11/2006 | Thiedig | ............. | F16L 3/1091 248/74.4 |
| 2007/0264099 A1 * | 11/2007 | Huang | ............. | F16B 13/061 411/38 |
| 2010/0192505 A1 * | 8/2010 | Schaefer | ............. | A47B 96/14 52/653.2 |
| 2010/0320346 A1 * | 12/2010 | Phillips | ............. | F16B 11/006 248/309.1 |
| 2011/0042528 A1 * | 2/2011 | Tucker | ............. | F16L 3/133 248/62 |
| 2011/0163208 A1 * | 7/2011 | Tjerrild | ............. | F16L 3/133 248/65 |
| 2013/0091787 A1 * | 4/2013 | Puga | ............. | F24S 25/61 52/173.3 |
| 2015/0129742 A1 * | 5/2015 | Okanaka | ............. | B60K 5/1208 248/634 |
| 2016/0069480 A1 * | 3/2016 | Rego | ............. | F16B 5/065 248/65 |
| 2016/0251845 A1 * | 9/2016 | Evans | ............. | E04B 2/82 52/698 |

\* cited by examiner

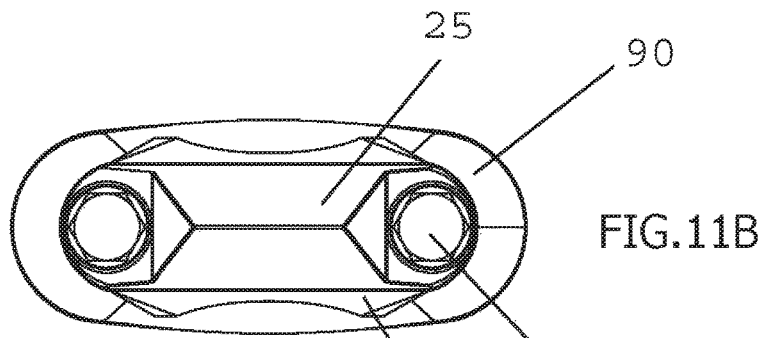
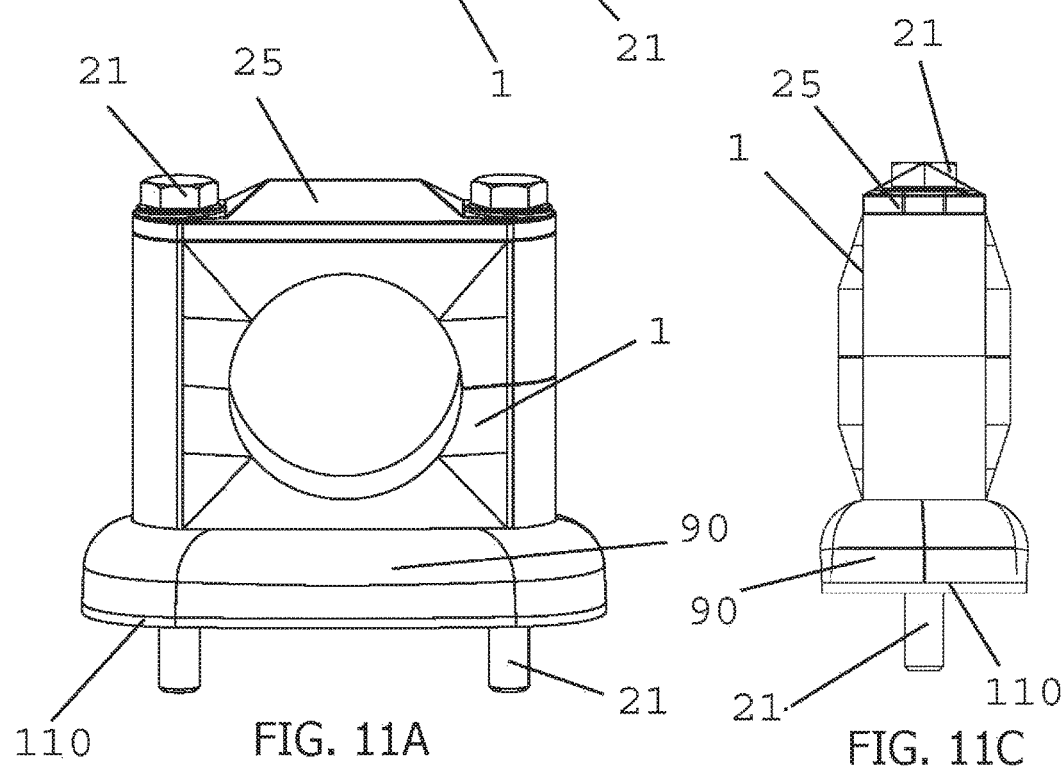
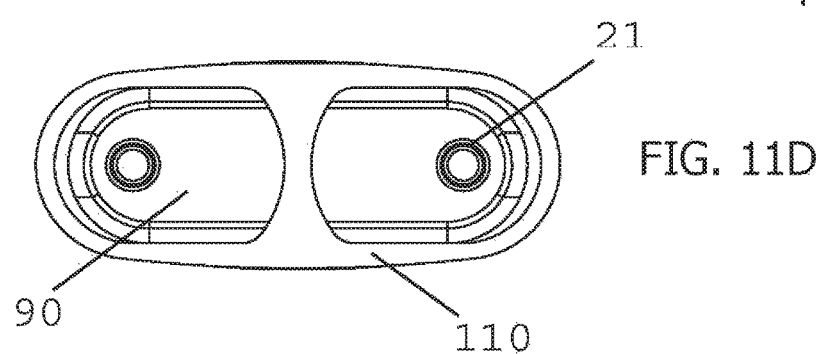

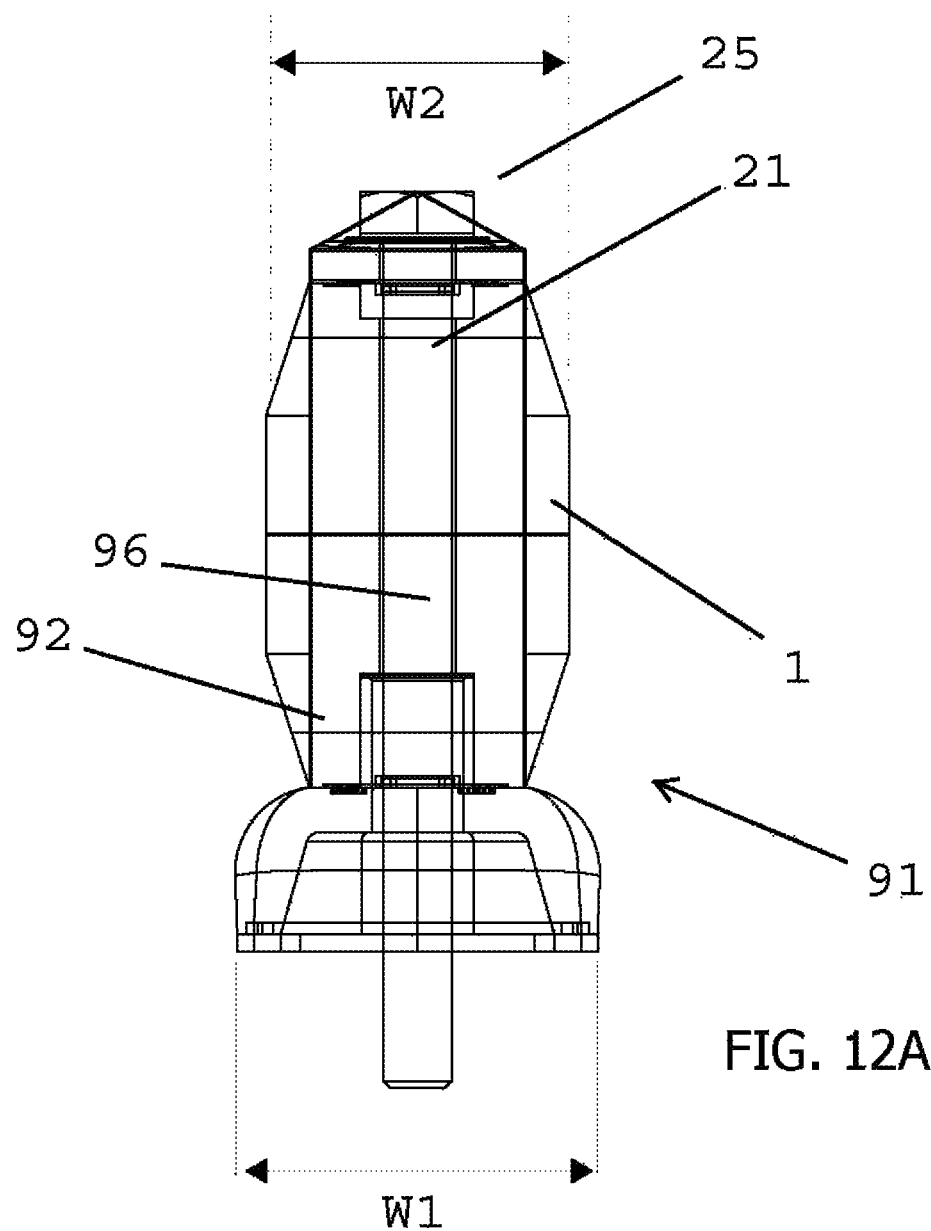

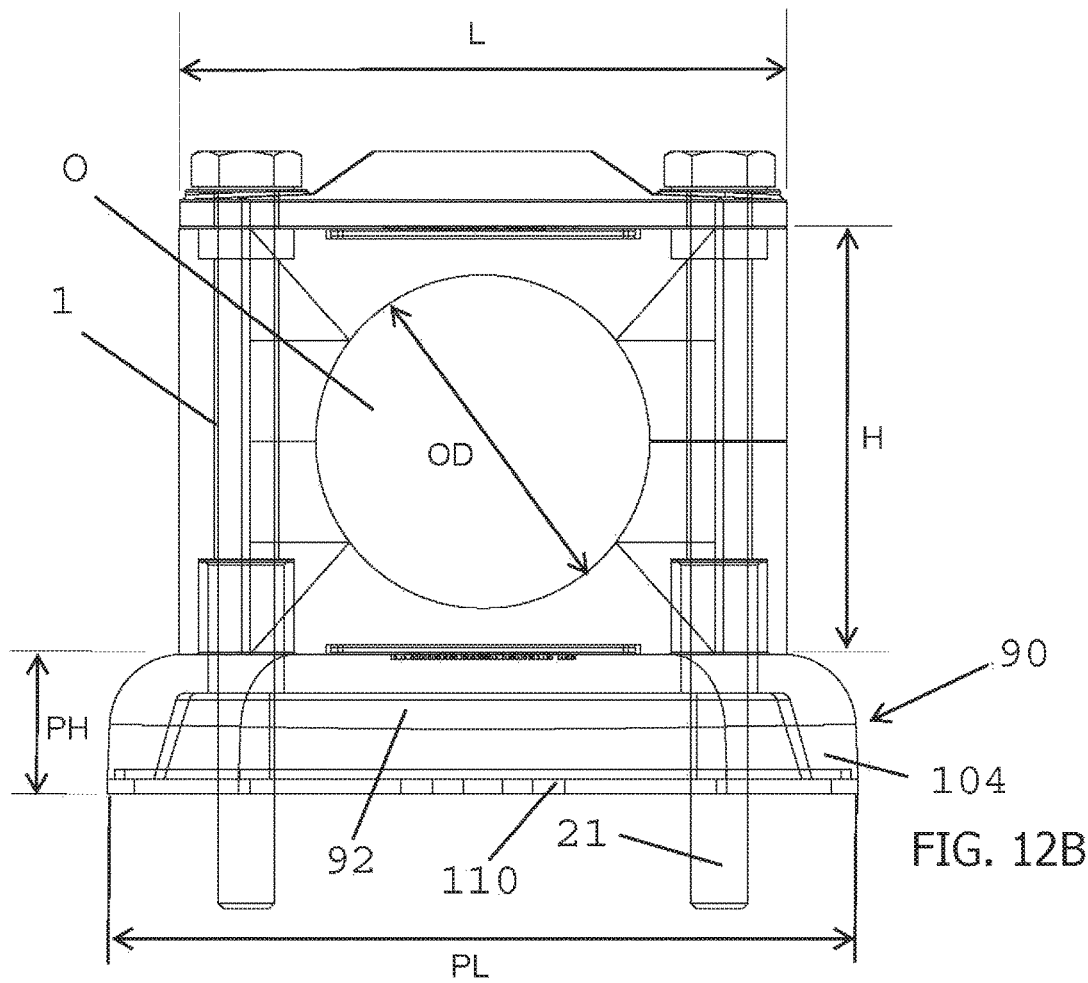
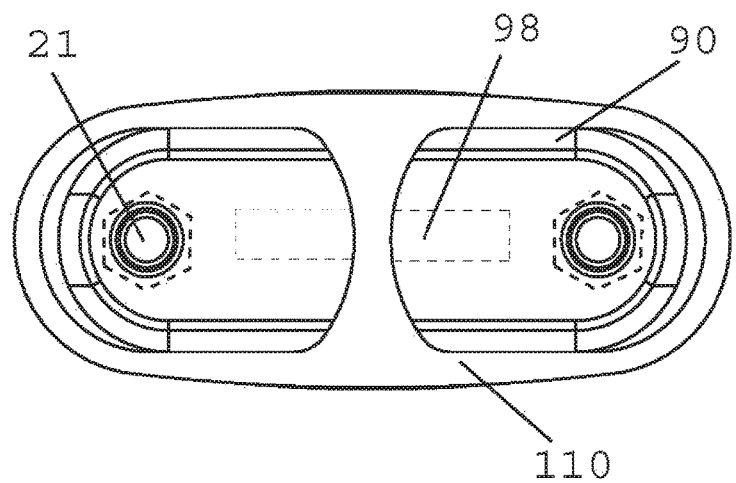

ANCHOR SEALING HYGIENIC BRACKET

RELATED APPLICATIONS

This application is a continuation-in-part of U.S. patent application Ser. No. 14/998,664 filed Jan. 29, 2016 entitled ANCHOR SEALING HYGIENIC BRACKET which Applicant claims the benefit of provisional application Ser. No. 62/176,041, filed Feb. 9, 2015.

BACKGROUND OF THE INVENTION

1. Field of the Invention

The present invention relates to block or rounded style tube and pipe hangers, herein referenced to as block style tube and pipe hangers, and more particularly, to an offset anchor bracket which allows for the block style tube and pipe hangers to be secured to a wall, panel or equipment frame that may include square tubing for support in either a vertical or horizontal orientation wherein the wall, panel or equipment frame is fixed and there may not be access to the reverse side thereof, the anchor bracket covers and seals the fasteners which secure the anchor bracket to the substrate wall, panel or equipment frame. Also, in areas where there is access to the reverse side of the wall, panel or equipment frame, nuts and bolts may be used in place of the anchor to mount the bracket to the panel.

2. Description of the Prior Art

Pipe and tube supports are known for their use in supporting piping and tubing systems in residential and commercial buildings, as well as throughout numerous industrial manufacturing facilities, for example, food, dairy, beverage, chemical, personal care, bio-processing, and pharmaceutical manufacturing industries. Many pipe hanging configurations have either an inner layer or an inner block made from an elastomeric or rigid plastic materials to provide some combination of dampening, shock absorption, and insulation. With respect to industrial facilities, especially those in which clean rooms, sanitary and sterile environments which are critical to the manufacturing process, the known pipe supports must be configured to have a smooth contact surface to prevent the buildup of any other contaminants from collecting and impacting the effect of the clean, sanitary, sterile environments. Still further, in such clean rooms and the like, all exposed surfaces must be smooth, which means that no irregular surfaces such as threaded rods, fasteners, crevices, or the like can be exposed to the environment of the clean room. It further means that all surfaces of such supports and frames, must be flush with its underlying strata or support to prevent any buildup of dirt or bacteria between the frames and support structure.

The block style hangers for use in the hanging or vertical support of tubing and piping may use plastic or silicone grommets which define an interior diameter (I.D.) to directly support and encompass the outer diameter (O.D.) of a pipe or tube. Silicone or plastic grommets themselves are supported by a metal frame, which is often welded to supporting structural steel or secured by a threaded connection to a hanger in the form of a vertical rod depending from a bracket or plate secured to the ceiling, or extending upwardly from the floor, from a bracket or plate secured to the floor strata. These block style hangers may be used individually or due to their substantially square and rectangular shape, they alternatively can easily and efficiently be stacked in vertical relationship to provide an offset between multiple piping and tubing arranged in parallel and set the center lines of the respective tubing or piping. The grommets act as a dampening cushion or insulator between the hardware and the supporting utility. The grommet parts define the molded inner diameter which fits around an outer diameter of the pipe, tube or conduit. The size of the inner diameter of the grommet controls the amount of force required to allow the tube, pipe or conduit to slide through the grommets. A smaller inner diameter creates a tight fit or an anchor, and a larger inner diameter creates a loose fit or guide which allows the tube, pipe or conduit to slide along an axis. The known grommets and inserts for such hangers are held together and in place around the pipe or conduit solely by the use of mounting hardware and framework or brackets which attach to grommets to one another around the pipe or conduit. The grommets together with the mounting hardware and framework are then secured by means of a support rod to a support plate or support bracket which is secured to the ceiling or ceiling beam, or to a floor bracket in which the rod extends upwardly from the floor supporting the tubing or piping. In many of the industries mentioned, wherein a clean, sterile room is required, the piping structures are required and are specified to be installed on a slope and centerline with a general slope being from one eighth to one quarter inch drop per foot. This specification requirement is to ensure that the tubing or pipeline can self drain via gravity. A problem arises when tubing or piping must be installed and supported from a ceiling or wall which is covered by a panel and perhaps insulated panels, in a clean, sanitary or sterile room which requires the use of specialized fasteners for securing an anchor bracket to a support panel. Fasteners may include toggle bolts, rivet-like structures, or ordinary nuts and bolts. Also, suitable would be brand name fasteners such as Jack Nut and Fab-Lok. These devices will be referred to generally as toggle bolt-like fasteners in the balance of this document. Since the toggle bolt-like structure presents an uneven surface which can collect dirt or bacteria, and often are fabricated from grades of metals which deteriorate in caustic conditions, it is necessary to have an anchor bracket for the block type tubing and piping hanger which can be secured to such toggle bolt-like fastener, yet completely cover the fastener and protect that portion of the toggle bolt-like fastener which extends into the clean, sterile, or sanitary room so that the caustic solutions used in routinely washing or cleaning such rooms will not degrade the fastener, yet allows for support for the anchor bracket for either directing supporting a block type tubing and piping hanger from the frame of the block style tube and pipe hanger, or for supporting a support rod extending outwardly and in communication with a block style tube and pipe hanger for supporting the tubing or piping.

The structural design of the anchor bracket also allows for several methods for sealing the anchor bracket over the portion of the toggle bolt-like fastener which extends into the clean, sterile or sanitary room. This sealing can be accomplished either with an O ring, or with a custom designed sealing pad with silicone caulk. The seal is an important factor because the end user wants to be assured that the inside of the cup does not turn into a depository for bacteria, liquids, or the like.

Applicant has developed an offset anchor bracket which can protect and encapsulate the toggle bolt-like fasteners utilized to secure the anchor bracket to a panel to which access to the reverse side may be denied, and allow the anchor bracket to be secured and adjusted to provide for the correct slope and centerline of the resultant tubing and piping, the anchor bracket having a pair of receivers for direct receipt of the fasteners utilized with the hardware of a block style tube and pipe hanger to secure the hanger or multiple hangers in series directly to the anchor bracket and the underlying panel strata. The anchor bracket is both secured to the panel and protects the irregular surface of the toggle bolt-like fasteners utilized to secure it to the panel, the anchor bracket being fabricated from either stainless steel or from a polymer or elastomeric material which is impervious to and does not react to the caustic solutions utilized in cleaning a clean, sterile or sanitary room.

OBJECTS OF THE INVENTION

An object of the present invention to provide for a novel assembly which simplifies the total installation of a pipe hanger and allows the installer to secure pipe hangers to panels which constitute a ceiling, wall, floor, panel, or equipment frame to which there is no access to the reverse side thereof.

A still further object of the present invention is to provide for a novel support assembly in which the anchor bracket covers and protects the support bolts extending through the ceiling, wall, floor, panel, or equipment frame and encapsulates that portion of the bolt exposed within the clean room to protect it from caustic cleaning solutions or the like utilized to sanitize the clean room.

A further object of the present invention is to provide for a novel support assembly for the installation of block style tube and pipe hangers in which the anchor bracket has a pair of receivers to directly secure a block style tube and pipe hanger either singly or in serial combination.

A still further object of the present invention is to provide for a novel support assembly for a block style tube and pipe hanger in which an anchor bracket is formed with a single receiver to accept a support rod for supporting a block style tube and pipe hanger at a distance from the panel.

A still further object of the present invention is to provide for a novel installation assembly for block style pipe and tube hangers to a ceiling, wall, floor, panel, or equipment frame to which access to the reverse side is denied, allowing the installer to adjust the elevation and centerline and slope of the tubing or piping.

Another object of the present invention is to provide for a novel support structure for block style tube and pipe hangers in which the fasteners utilized in the frame hardware of the block style tube and pipe hangers are used to directly secure the block style tube and pipe hangers to the anchor bracket of the present assembly, and hence the panel to which it is secured.

Another object of the present invention is to provide for a novel support structure for block style tube and pipe hangers in which the fasteners utilized in the frame hardware of the block style tube and pipe hangers are used to directly secure the block style tube and pipe hangers to the ceiling, wall, floor, panel, or equipment frame to which it is secured.

Another object of the present invention is to provide for a novel support structure for block style tube and pipe hangers in which the fasteners utilized in the frame hardware of the block style tube and pipe hangers are aligned directly with a threaded internal bore of an anchor bolt or toggle bolt within the cavity of the anchor bracket to secure the block style tube and pipe hangers to the ceiling, wall, floor, panel, or equipment frame to which it is secured.

Another object of the present invention is to provide an anchor bracket that encapsulates that portion of the bolt exposed within the clean room to protect it from caustic cleaning solutions or the like utilized to sanitize the clean room having a smaller footprint by using only two bolts to secure the block style tube and pipe hangers to the ceiling, wall, floor, panel, or equipment frame to which it is secured.

Another object of the present invention is to provide an anchor bracket that provides for the pipe within the block style tube and pipe hangers to be mounted closer to the ceiling, wall, floor, panel, or equipment frame to which it is secured.

SUMMARY OF THE INVENTION

An offset hygienic anchor sealing bracket for installation of block, style tube and pipe hangers to a wall, paneled strata or equipment frame in which there is no access to the reverse side, there being a need to secure the anchor bracket to an anchor bolt or toggle bolt and simultaneously shield the exposed toggle bolt structure from the environment of the clean room, sterile room, or sanitary room in order to protect the irregular surface of the toggle bolt from caustic cleaning solutions and to prevent the buildup of dirt and bacteria, the anchor bracket having bored pedestals in communication with the cavity which encapsulates the exposed portion of the toggle bolt and secures the anchor bracket thereto, the anchor bracket having a plurality of female threaded receptacles for receipt of fasteners utilized in assembling block style tube and pipe hangers, thus securing the block style tube and pipe hanger to the wall, panel or equipment frame at a desired slope and centerline.

The present invention is also related to a further embodiment of a hygienic anchor bracket and sealing washer for installation of block, style tube and pipe hangers to a ceiling, wall, floor, paneled strata or equipment frame in which there may be no access to the reverse side, there being a need to secure the anchor bracket to an anchor bolt or toggle bolt and simultaneously shield the exposed toggle bolt structure from the environment of the clean room, sterile room, or sanitary room in order to protect the irregular surface of the toggle bolt from caustic cleaning solutions and to prevent the buildup of dirt and bacteria. In this further embodiment, the anchor bracket is a unitary piece having an oval pedestal forming the cavity which encapsulates the exposed portion of the toggle bolt. The oval pedestal has two receiver receptacles for insertion of fasteners utilized in assembling block style tube and pipe hangers. The fasteners once inserted are threaded into an internal bore of an anchor bolt or toggle bolt securing the block style tube and pipe hanger to the wall, panel or equipment frame at a desired slope and centerline. As a unitary piece the anchor bracket is easy to install and requires only two bolts aligned with the anchor bolt or toggle bolt for attachment thereby reducing materials and costs. By using only two bolts for attachment, the anchor bracket has a smaller footprint and may be of any required size and dimensions to provide for a pipe inserted through the block style tube and pipe hanger to be closer to the ceiling, wall, floor, panel or equipment frame thereby taking up less space.

The present invention is also related to a hygienically sealable anchor bracket for a ceiling, wall, floor, equipment frame or other paneled strata for block style pipe and tube hangers, said hygienically sealable anchor bracket comprising a plurality of attachment fasteners for insertion through and securing to said ceiling, wall, floor, equipment frame, or other paneled strata, said attachment fastener having an internally threaded bore; an anchor bracket comprising a pedestal having a cavity; and a plurality of receptacles extending out from the pedestal; and wherein said anchor bracket is configured to be positioned to surround said secured plurality of attachment fasteners to form a seal to protect the irregular surfaces of an exposed upper portion of the plurality of attachment fasteners extending from said ceiling, wall, floor, equipment frame, or other paneled strata from caustic cleaning solutions and to prevent the buildup of dirt and bacteria; and a securing fastener passing through one of said plurality of receptacles to engage with one of said internally threaded bores on one of said plurality of attachment fasteners, securing said block style pipe and tube hangers for embracement with a diameter of a pipe or tube to said ceiling, wall, floor, equipment frame, or other paneled strata. The hygienically sealable anchor bracket may comprise a sealing washer which may be oval in shape. The upper portion of the attachment fastener may extend through said ceiling, wall, floor, equipment frame, or other paneled strata are formed as bolt heads and washers of various sizes; and embodiments of the sealing washer may have widened openings to surround and seal said upper portions of the plurality of attachment fasteners to said ceiling, wall, floor, equipment frame, or other paneled strata. The pedestal of the hygienically sealable anchor bracket may be oval in shape and may have a curved outer wall and base portion. The pedestal may also comprise a recess and a sealing washer for insertion in the recess. The hygienically sealable anchor bracket may comprise a single attachment plate. The hygienically sealable anchor bracket may also comprise using only two bolts to assemble and secure the block style pipe and tube hanger and anchor bracket to said ceiling, wall, floor, equipment frame, or other paneled strata.

The present invention is also related to a hygienically sealable anchor bracket for a ceiling, wall, floor, equipment frame or other paneled strata for block style pipe and tube hangers, said hygienically sealable anchor bracket comprising a plurality of toggle bolt assemblies for insertion through and securing to said ceiling, wall, floor, equipment frame, or other paneled strata, said toggle bolt having an internally threaded bore formed in a bolt head; an anchor bracket comprising a pedestal having a cavity; and a plurality of receptacles extending out from the pedestal; and wherein said anchor bracket is configured to be positioned to surround said secured plurality of toggle bolt assemblies to form a seal to protect the irregular surfaces of said plurality of toggle bolt assemblies from caustic cleaning solutions and to prevent the buildup of dirt and bacteria; and a securing fastener passing through one of said plurality of receptacles is configured to engage with one of said internally threaded bores on said toggle bolt head, securing said block style pipe and tube hangers for embracement with a diameter of a pipe or tube to said ceiling, wall, floor, equipment frame, or other paneled strata. The hygienically sealable anchor bracket may comprise a sealing washer that may be oval in shape. The sealing washer may have widened openings configured to surround upper portions of the toggle bolt assemblies that extend from said ceiling, wall, floor, equipment frame, or other paneled strata, the upper portions formed in various configurations and sizes. The pedestal of the hygienically sealable anchor bracket may be oval in shape and may have a curved outer wall and base portion. The pedestal may also comprise a recess and a sealing washer for insertion in the recess.

The present invention is further related to a method of hygienically sealing a plurality of attachment fasteners extending from a ceiling, wall, floor, equipment frame or other paneled strata to protect the irregular surfaces of said plurality of attachment fasteners from caustic cleaning solutions and prevent the buildup of dirt and bacteria, comprising extending an upper portion of the attachment fastener having an internally threaded bore through said ceiling, wall, floor, equipment frame, or other paneled strata; securing said attachment fastener to said ceiling, wall, floor, equipment frame, or other paneled strata; aligning an anchor bracket having a pedestal and plurality of receptacles to surround and seal the upper portion of the attachment fastener to said ceiling, wall, floor, equipment frame, or other paneled strata to protect the irregular surfaces of said exposed upper portion from caustic cleaning solutions and to prevent the buildup of dirt and bacteria; inserting a securing fastener through said receptacle of said anchor bracket and said internally threaded bore of the attachment fastener; securing said block style pipe and tube hangers for embracement with a diameter of a pipe or tube to said ceiling, wall, floor, equipment frame, or other paneled strata. The method of hygienically sealing a plurality of attachment fasteners extending from a ceiling, wall, floor, equipment frame or other paneled strata to protect the irregular surfaces of said plurality of attachment fasteners from caustic cleaning solutions and prevent the buildup of dirt and bacteria in accordance may comprise inserting a sealing washer in a recess of a base portion of the pedestal.

BRIEF DESCRIPTION OF THE DRAWINGS

These and other objects of the present invention will become apparent, particularly when taken in light of the following illustrations wherein:

FIG. 11A is a front elevation view of a typical block style tube and pipe hanger and the further embodiment of the anchor bracket of Applicant's invention;

FIG. 11B is a top view of a typical block style tube and pipe hanger and the further embodiment of the anchor bracket of Applicant's invention;

FIG. 11C is a side elevation view of a typical block style tube and pipe hanger and the further embodiment of the anchor bracket of Applicant's invention;

FIG. 11D is a bottom view of a typical block style tube and pipe hanger and the further embodiment of the anchor bracket of Applicant's invention;

FIG. 12A is a side elevation internal view of a typical block style tube and pipe hanger and the further embodiment of the anchor bracket of Applicant's invention;

FIG. 12B is a front elevation internal view of a typical block style tube and pipe hanger and the further embodiment of the anchor bracket of Applicant's invention;

FIG. 12C is a bottom internal view of a typical block style tube and pipe hanger and the further embodiment of the anchor bracket of Applicant's invention.

DETAILED DESCRIPTION OF THE INVENTION

Figure 1:
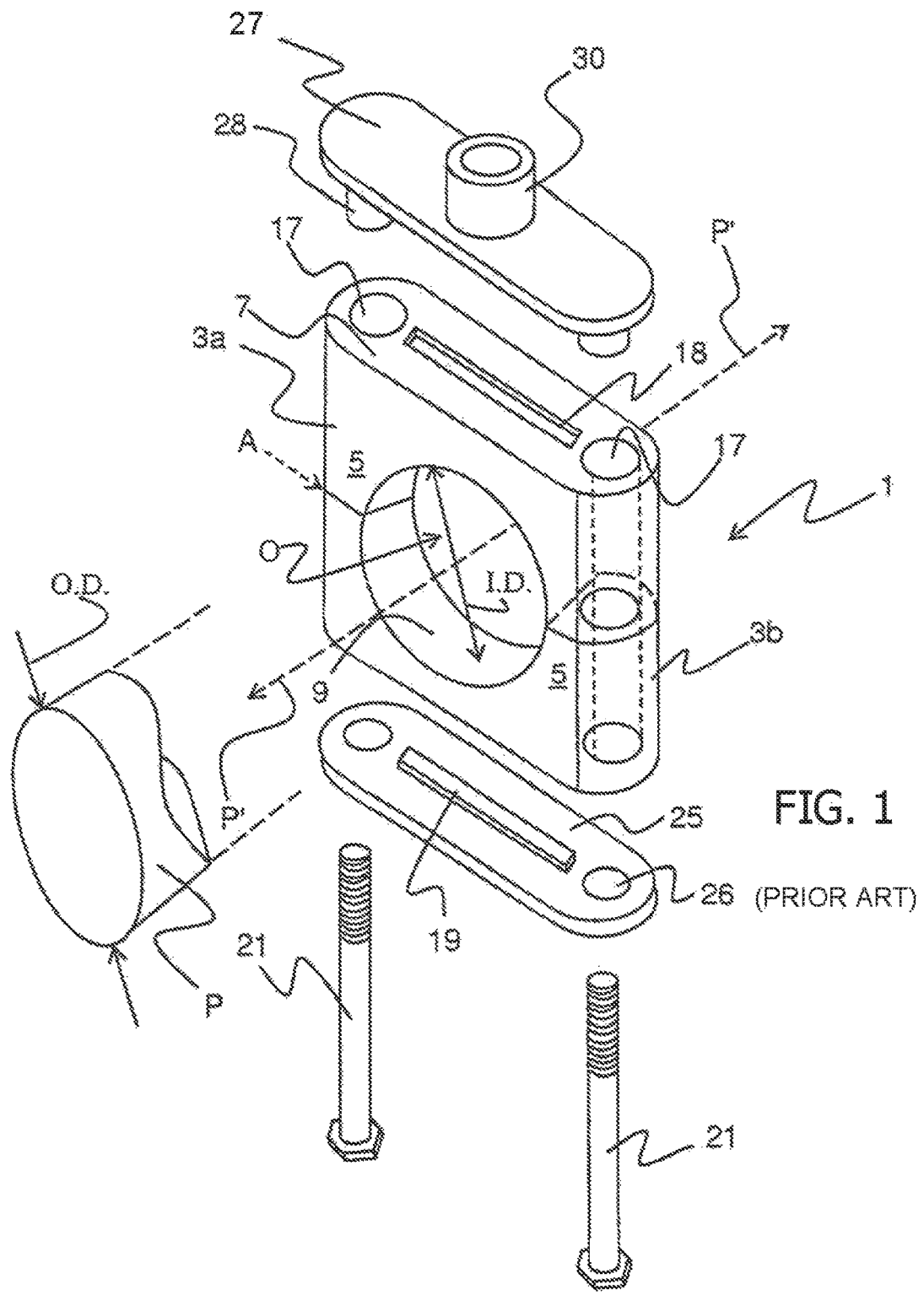
FIG. 1 is an exploded isometric assembly view of a typical block style tube and pipe hanger of the prior art illustrating a grommet lock and framework.

FIG. 1 illustrates a block style pipe and tube grommet block 1 as used in the prior art. The grommet block 1 consists of two attached and substantially identical upper and lower grommets 3 defining a pipe passage zero having an inner diameter (I.D.) through which a pipe, tube, or conduit P having an outer diameter can pass. The two grommets 3 are attachable and also separable along a grommet separation plane A. The O.D. of the pipe can be accommodated by a range of I.D.'s of the grommet block depending on how secure the pipe is to be supported and held by the support. The tighter the tolerance of the pipe, and the grommet block I.D., the more securely the pipe is held. It is to be appreciated that with a larger tolerance the pipe is more inclined or permitted to move or slide axially generally along a pipe axis P' in the pipe passage O. The grommets 3a and 3b can be modified to allow for different pipe sizes, tolerances, etc., so that the pipe, tube or conduit P is either securely held in the pipe passage area O or in the case of a loose fit, the conduit is guided essentially linearly along the pipe axis P' through the pipe passage O.

Figure 2:
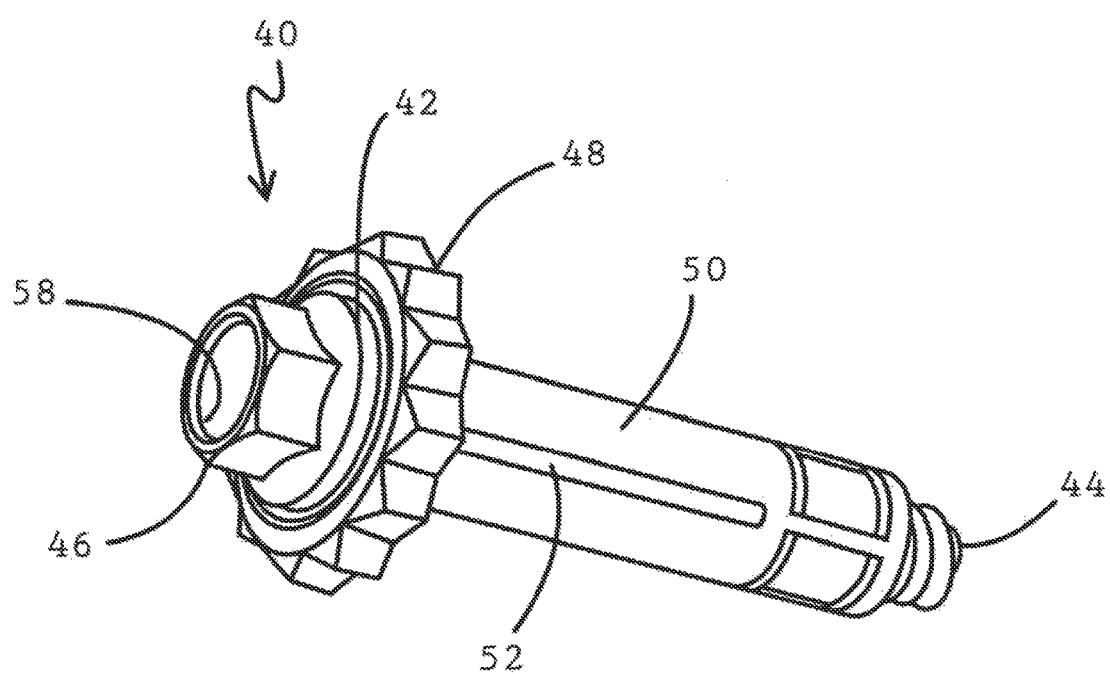
FIG. 2 is a perspective view of a toggle bolt assembly suitable for use with Applicant's anchor bracket.
Figure 3:
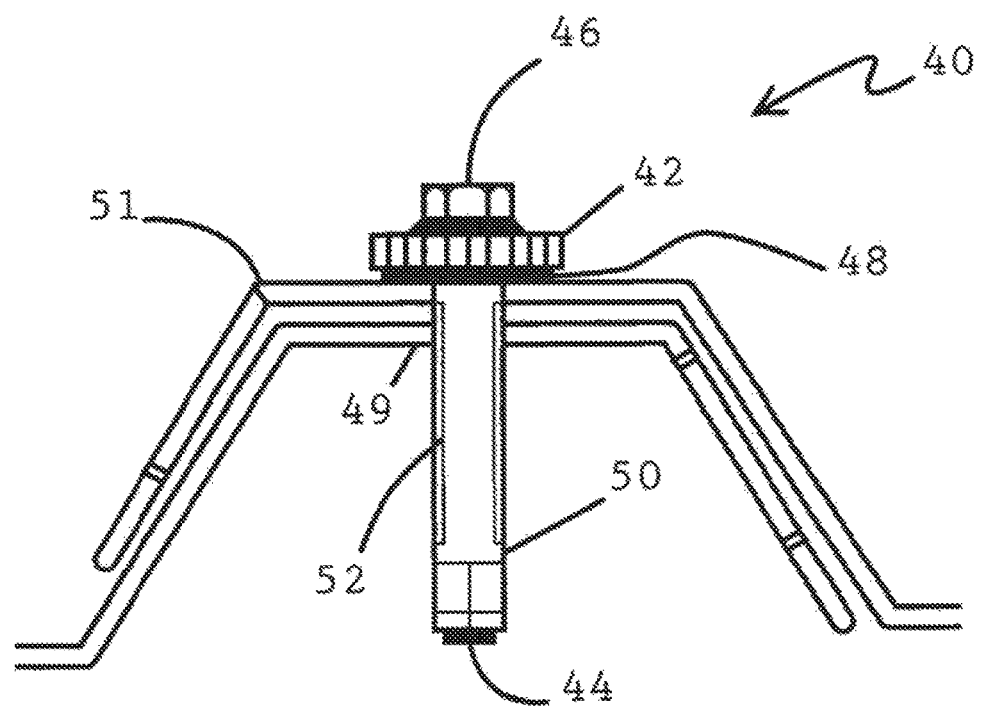
FIG. 3 is a side view of the toggle bolt of FIG. 2 inserted through a panel.
Figure 3A:
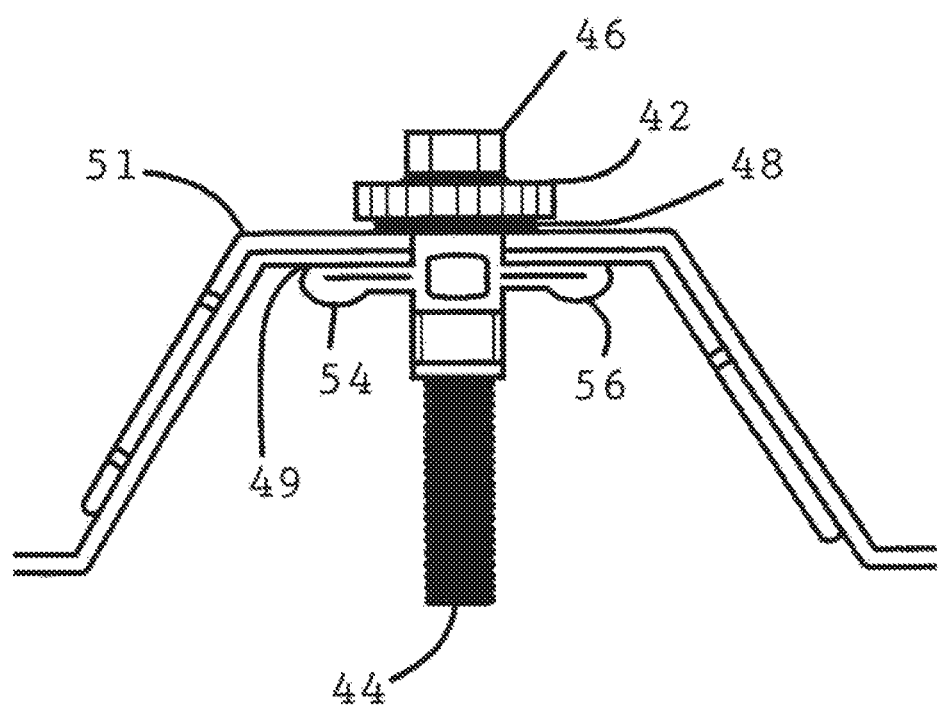
FIG. 3A is a side view of the toggle bolt of FIGS. 2 and 3 in closed or secure orientation.
Figure 4:
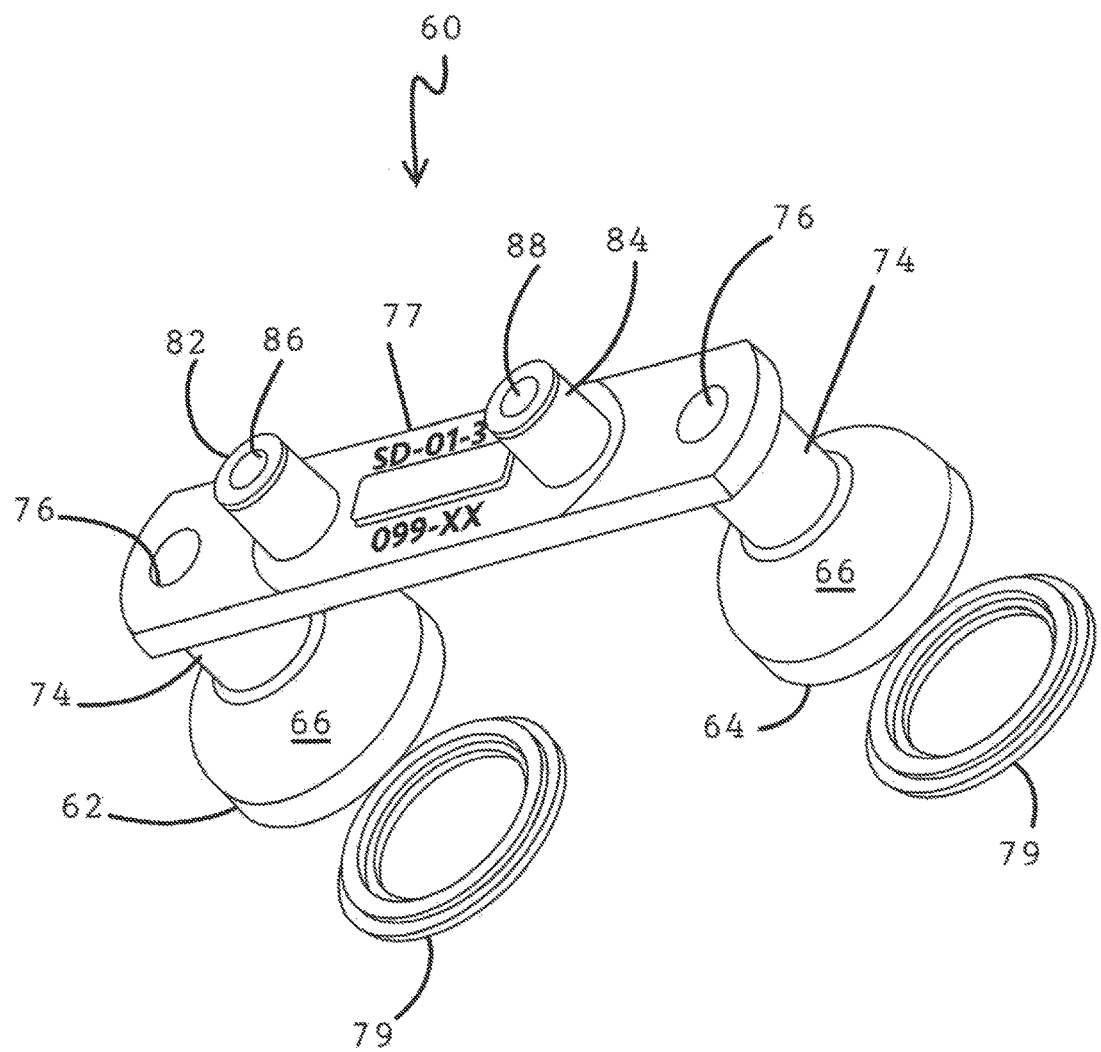
FIG. 4 is a perspective isometric view of the anchor bracket of Applicant's invention used to secure a block style tube and pipe hanger to a panel.
Figure 5:
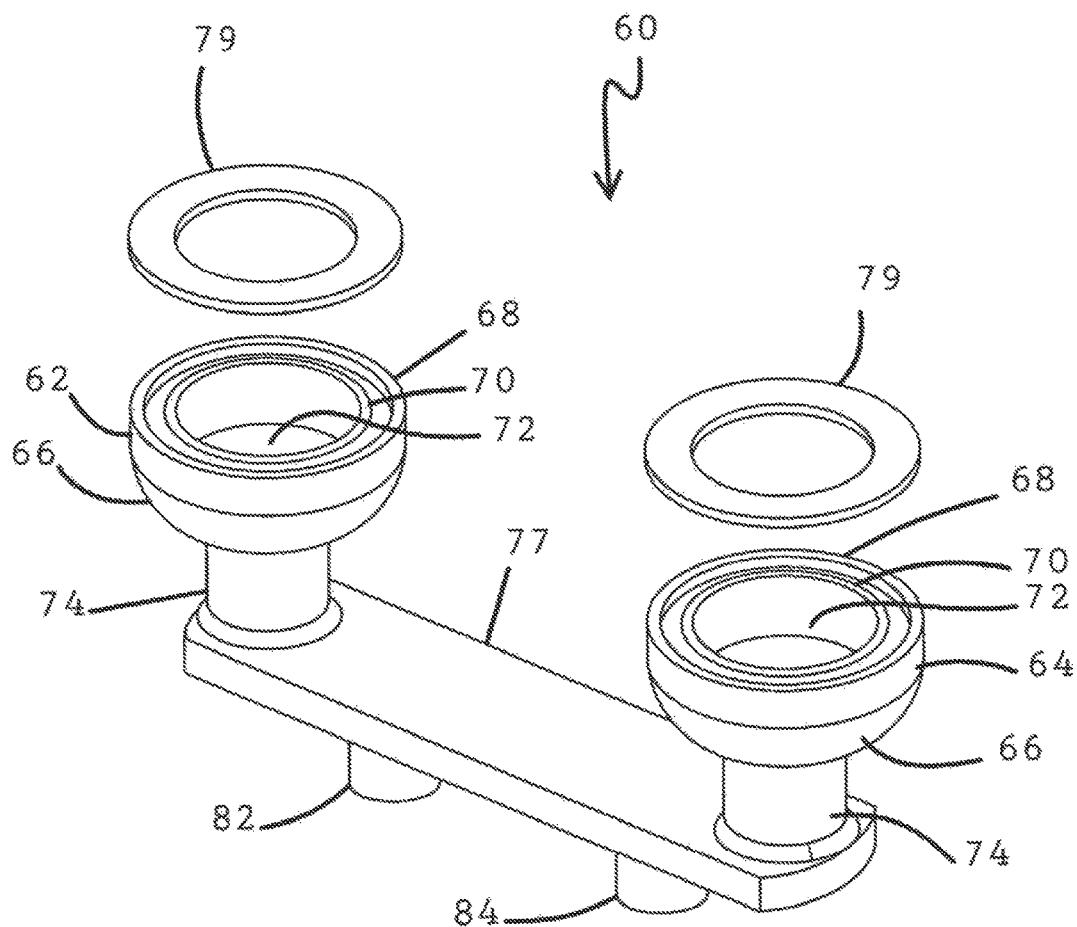
FIG. 5 is a perspective isometric bottom view of the anchor bracket of FIG. 4.
Figure 6:
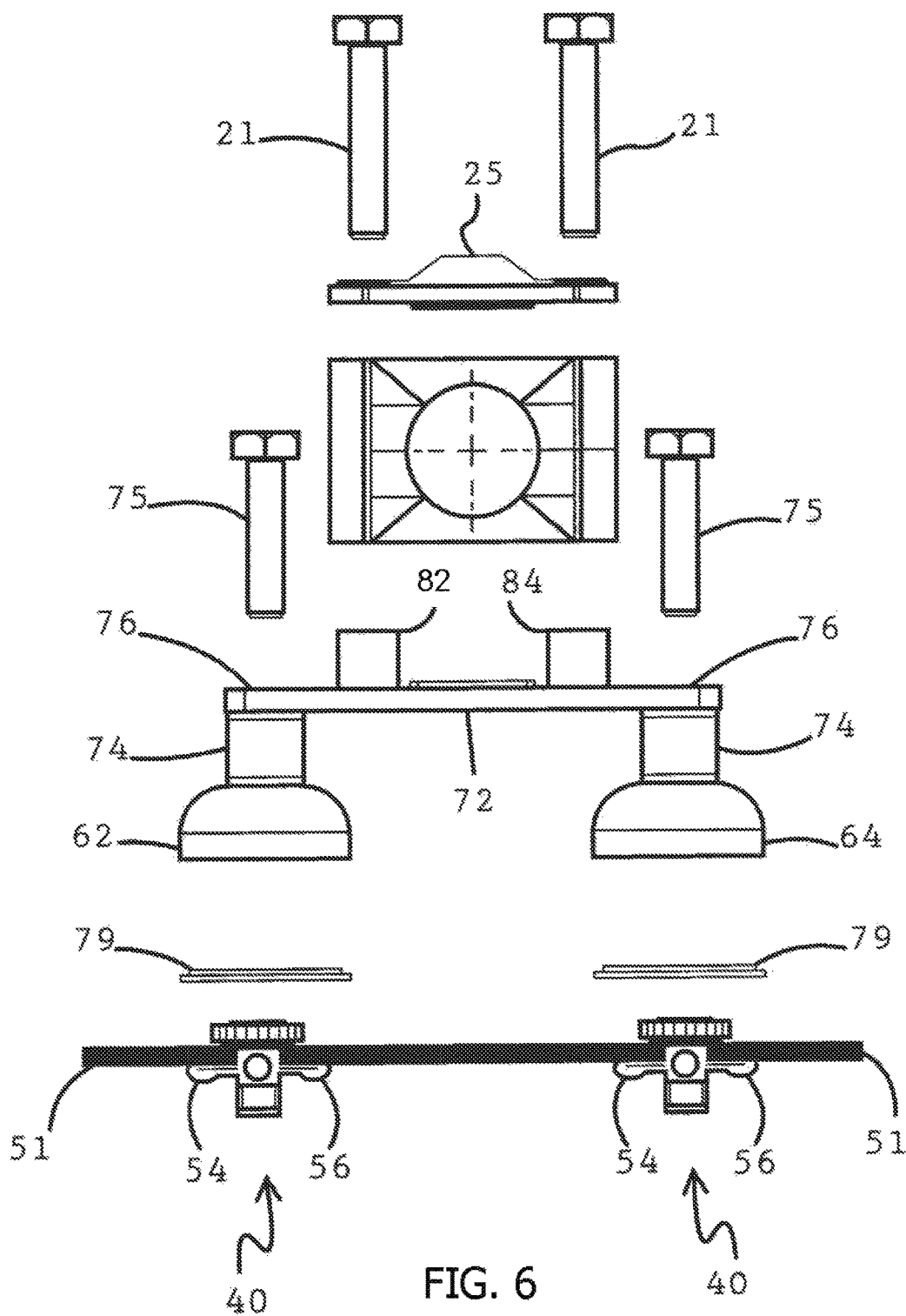
FIG. 6 is an exploded view of a block style tube and pipe hanger in conjunction with Applicant's anchor bracket.

The grommets 3 have bolt holes 17 that extend through the grommets 3a and 3b in a substantially perpendicular alignment to the pipe axis P' extending through the passage O. To this end, each grommet 3 is comprised of a pair of oppositely disposed legs 5 through which a bolt hole 17 is formed, a substantially flat top surface 7 against which a portion of the frame work is generally secured, a curved inner surface 9 defining the I.D. of the passage O and each leg 5 having a substantially planar end surface for mating to and engaging with a corresponding planar end surface of an opposing grommet. The top surface 7 of each grommet 3 may be provided with a detent or slot 18 for receiving a corresponding protrusion or key 19 formed in an attachment plate 25 and 27, or even another grommet. Such a detent or slot 18 and protrusion or key 19 would facilitate maintaining alignment of the bolt holes 17 of the grommet with the holes 26 in the attachment plate 25 as set forth in further detail. The union of detent 18 and the protrusion 19 would also form a compression fit or some other means of attachment to enable connecting of the attachment plates 25 and 27 to the grommets 3 until a bolt 21 can be inserted through the attachment plate hole 26 and the bolt hole 17 of the grommet to be secured by a threaded receiver 28 of the corresponding attachment plate. In FIG. 1, bolts 21 are shown being inserted from the lower attachment plate 25. The attachment plates 25, 27 form a framework that consists of a pair of bolts 21 which extends through the attachment plate holes 26 and bolt holes 17 of the grommets 3 and connect and secure the attachment plates 25, 27 and grommets 3 together, as illustrated in FIG. 1. During assembly, after passing through the holes 26 in the bottom attachment plate 25 and bolt holes 17 in the grommets 3a and 3b and coming out the other end, the bolts 21 connect to either the secured threaded receiver 28 in conjunction with the top attachment plate 27, or a nut supported on or in conjunction with the top plate 27 to complete assembly of the framework. The attachment plate 27 includes a hanger attachment receiver 30 which may connect to a hanger rod by threaded fasteners or by welding and thence to an attachment plate as part of suspension assembly which supports the pipes support and pipe to a floor or ceiling. The top and bottom attachment plates 25, 27 are pulled essentially flush against the grommets top surfaces 7 when the bolts 21 are tightened into the receiver 28 or a separate nut. FIG. 2 is a perspective view of a toggle bolt assembly 40 suitable for use with Applicant's support plate, FIG. 3 is a side view of the toggle bolt 40 of FIG. 2 inserted through a panel, and FIG. 3A is a side view of the same toggle bolt of FIGS. 2 and 3 in a closed or locked position. In FIG. 2, toggle bolt installation illustrated in its configuration for the toggle bolt consists of a hex washer head machine screw 42 having an externally threaded shaft 44, and a hex head 46. Positioned adjacent the hex head 46 is a sealing washer 48. Positioned on the shaft 44 is a slotted aluminum sleeve 50, having a plurality of longitudinal slots 52 about its periphery. The toggle bolt 40 as illustrated in FIG. 2 would be inserted through an aperture 49 in the panel 51 or ceiling, wall, floor, or equipment frame, the aperture 49 being substantially identical to the circumference of the slotted aluminum sleeve 50. Once inserted through such aperture 49 through the panel 51, the sealing washer 48 would be juxtaposed the outer surface of the panel 51. The installer would then manipulate the hex washer head machine screw 42 by rotating said screw via the hex head 46, and in turn rotating the shaft 44 which would cause the slotted aluminum sleeve 50 to collapse towards the hex head 46 and the sealing washer 48 until it achieved the configuration as illustrated in FIG. 3A, wherein the slotted aluminum sleeve has now been transformed into a T-shape with two extended arms 54 and 56 having been formed by the collapsing of the slotted aluminum sleeve 50, aided by the peripheral longitudinal slots 52 formed therein. In this configuration, the only visible portion of the toggle bolt assembly 40 would be the hex head 46 and the sealing washer 48. The remainder of the assembly would be on the opposing side of the panel 51 and not viewable or accessible. The hex head 46 of the toggle bolt assembly 40 has an internal bore 58, internally threaded for receipt of the male end of a separate fastener. FIG. 4 is a perspective isometric view of an anchor bracket 60 of Applicant's invention used to secure a block style tube and pipe hanger to a panel, and FIG. 5 is a perspective isometric view of the bottom of anchor bracket 60 of FIG. 4. Anchor bracket 60 is comprised of two pedestals 62 and 64, the lower portions 66 of pedestals 62 and 64 are hollow and as best illustrated in FIG. 5, which a perspective bottom view of the anchor bracket 60, which consists of concentric walls 68 and 70 surrounding a cavity 72, the concentric walls providing additional support to the base of the pedestals. The cavity 72 in cooperation with the concentric walls 68 and 70 also provides a structure which allows for the use of an O-ring seal or a sealing pad 79 to ensure that the cavity 72 covers the toggle bolt-like fastener and also prevents the cavity 72 from becoming a depository for bacteria growth or the like. The pedestals 62 and 64 narrow from the base upwardly comprising a generally cylindrical portion 74 through which there is a bore 76 extending downwardly and in communication with the cavity 72 of the base portions. The pedestals 62 and 64 are secured by a generally planar cross member 77, "through which bores 76 extend. Formed on planar cross member 77 are two receiver receptacles 82 and 84 each having a bore 86 and 88 formed therein, the bore being internally threaded. Anchor bracket 60 may be of one-piece construction, but it would be recognized by those of ordinary skill in the art that it may be formed of separate elements which are heat welded to form the anchor bracket 60. In installation of a block style tube and pipe hanger as illustrated in FIG. 6 which is an exploded view, toggle bolts of the type illustrated in FIGS. 2 and 3 would be inserted through a panel after determining the correct distance between the two toggle bolts and any slope, alignment, or centerline requirement for the installation of the tubing or pipe. Once the toggle bolts were in secure position (FIG. 3A) with the panel, anchor bracket 60 would be positioned over the hex head 46 and sealing washer 48 of the toggle bolt. The hex head 46 and sealing bolt 48 would be receivable within the cavity 72 formed in the lower portion of each of the pedestals. Threaded fasteners 75 would then be inserted through the bores 76 in the cross-member 77, through the bores 76 in the cylindrical portion 74 of the pedestals and threadedly secured to the internally threaded bores 58 formed in the hex head 46 of the toggle bolt. In this fashion, the support plate 60 is now secured to the panel in the desired location and appropriate angle and the hex head 46 and sealing washer 48 are covered.

At this point of the installation, a tube or pipe would be positioned proximate the anchor bracket 60 having a block style tube and pipe hanger positioned thereabout. The bolts 21 utilized with the hardware to secure the grommets of the block style tube and pipe hanger together would be inserted through the respective attachment plates 25 and 27, and extend beyond the opposing attachment plate such that the bolts 21 could be secured into the female upstanding receiving receptacles 82 and 84 formed on cross member 77. In this manner, a block style tube and pipe hanger may be affixed to the anchor bracket 60 and thus to a panel to which there is no access to the reverse side. The lower portion 66 of pedestals 62 and 64 can be formed with a washer or sealing means 79 between the concentric support walls to effectuate a seal between the pedestals and the panel and completely encapsulate and protect the hex head and sealing washer of the toggle bolt. This is of particular importance when installed in a clean, sanitary, or sterile room.

FIG. 6 is an exploded view of the block style tube and pipe hanger 1 described and illustrated in FIG. 1 in conjunction with the anchor bracket 60 of FIG. 4.

Figure 7:
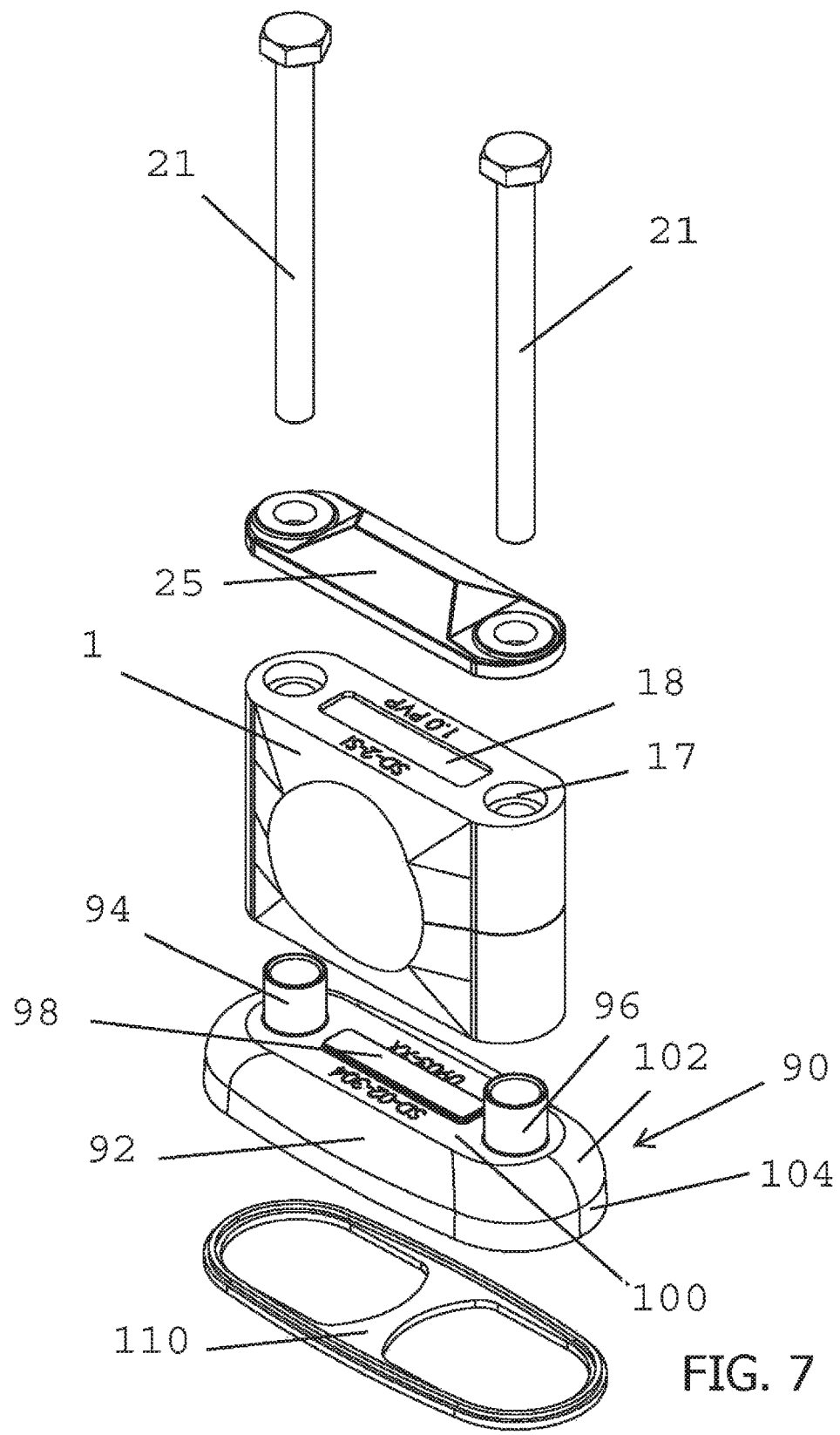
FIG. 7 is an exploded isometric assembly view of a typical block style tube and pipe hanger and a further embodiment of the anchor bracket of Applicant's invention used to secure the block style tube and pipe hanger to a panel.
Figure 8:
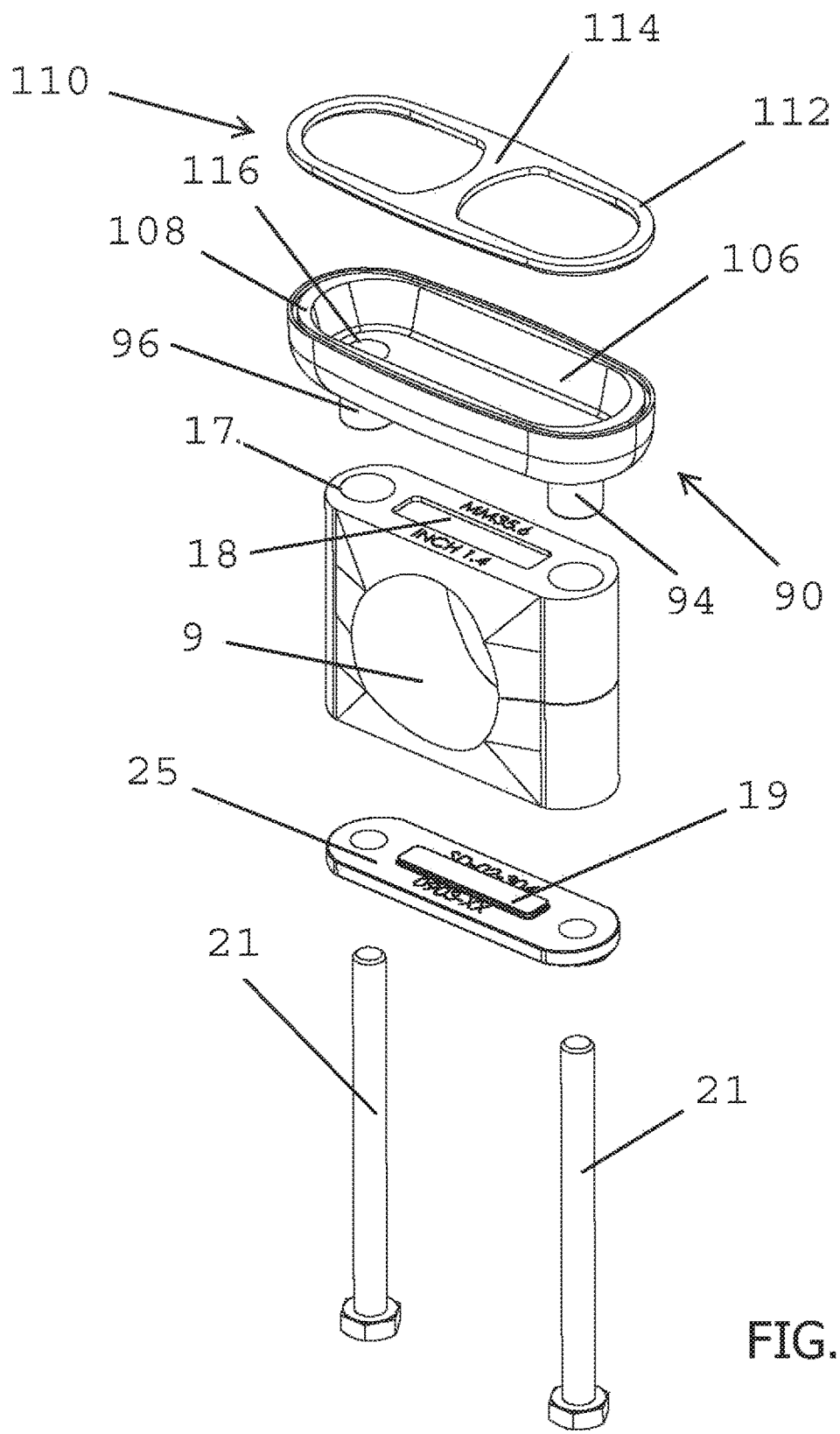
FIG. 8 is an exploded isometric assembly bottom view of a typical block style tube and pipe hanger and the further embodiment of the anchor bracket of Applicant's invention.

In a further embodiment, an anchor bracket 90 having an extended oval shaped pedestal 92 is shown in FIG. 7. The oval pedestal 92 has two receiver receptacles 94 and 96 each forming a through bore 116. The oval pedestal 92 may also have a protrusion or key 98 along its upper surface 100 to mate with a detent or slot 18 of the block style tube and pipe hanger 1. The upper surface 100 extends to an upper wall 102 that has a curvature to provide additional support to the base of the receptacles 94 and 96. The curved upper wall 102 straightens along a base portion 104 of the pedestal 92. As shown in FIG. 8 in a bottom view, the straight wall 106 of the base portion 104 has a recessed rim 108 to seat and seal against an oval shaped sealing washer 110. The sealing washer 110 is formed with an edge 112 and a bridge portion 114 that extends across the central portion of the sealing washer 110 to form two widened openings aligned below the bores 116 of the receptacles 94 and 96.

Figure 9:
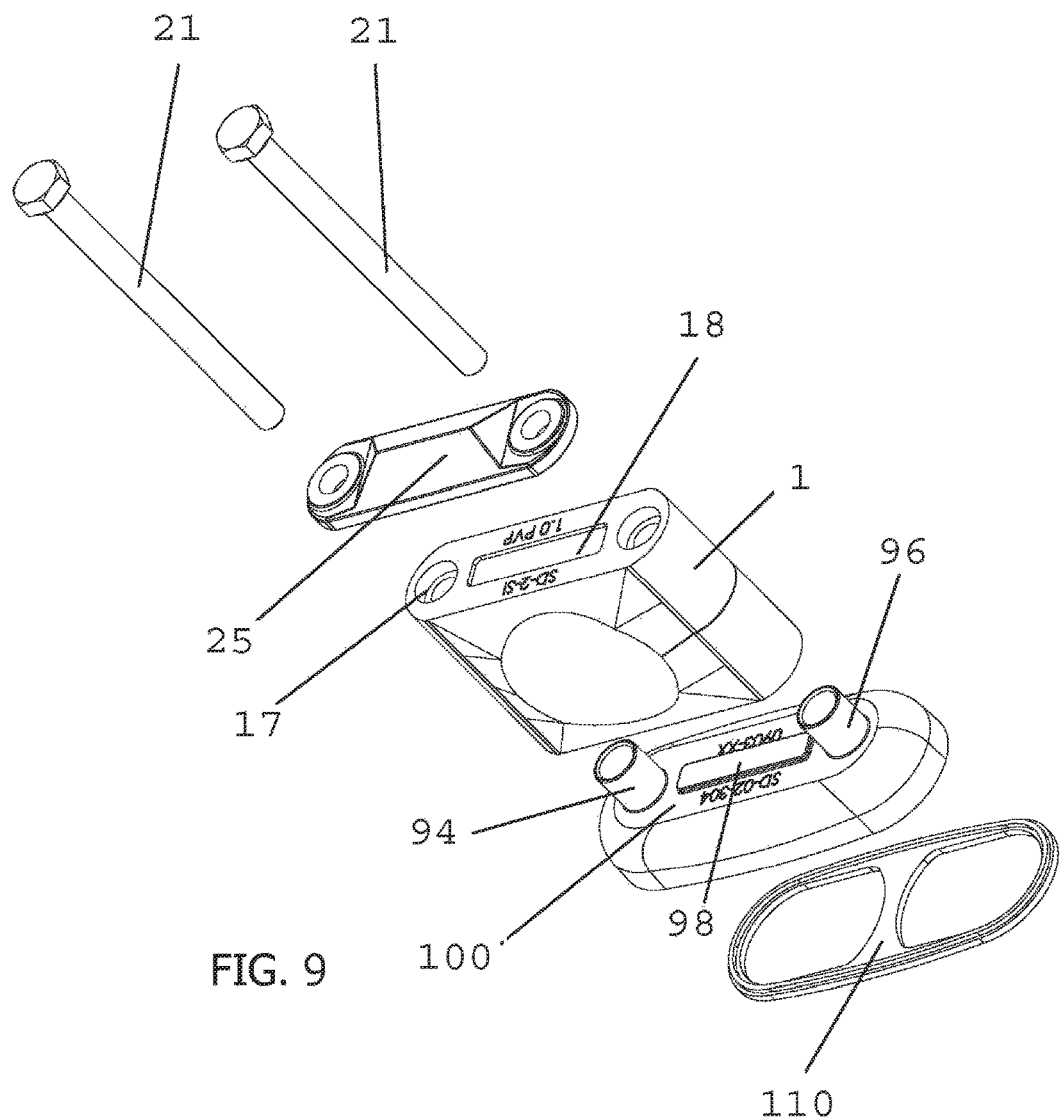
FIG. 9 is an exploded isometric assembly view of a typical block style tube and pipe hanger and the further embodiment of the anchor bracket of Applicant's invention.

The receptacles 94 and 96 are dimensioned for insertion into the bolt holes 17 of the block style tube and pipe hanger 1 with the protrusion or key 98 of the pedestal 92 configured to be inserted into the detent or slot 18. An important feature of the present embodiment is requiring only one attachment plate 25. Different than the former embodiment, the extended upper surface 100 connects the two receptacles 94 and 96 and with the curved upper wall 102 and base portion 104 that form the pedestal 92, the anchor bracket 90 is formed as a single unitary member removing the requirement for a second attachment plate and a planar cross member 77 that in the former embodiment connected the two separate pedestals 62 and 64 of the anchor bracket 60. As a single unit the installation of the anchor bracket 90 is much easier with fewer parts to hold and maneuver. As shown in FIG. 8, the sealing washer 110 may be seated within the recessed rim 108 and the two receptacles 94 and 96 align with the bolt holes 17 of the block style tube and pipe hanger 1. The protrusion or key 98 of the pedestal 92 aligns within the detent or slot 18 of the block style tube and pipe hanger 1 and the protrusion or key of the attachment plate 25 aligns with the upper detent or slot 18 of the block style tube and pipe hanger 1. As shown in FIG. 9, to assemble the block style tube and pipe hanger 1 and anchor bracket 90, the bolts 21 are inserted through the attachment plate 25, the pipe hanger 1, the receptacles 94 and 96 of the anchor bracket 90, and the sealing washer 110.

Figures 10A, 10B:
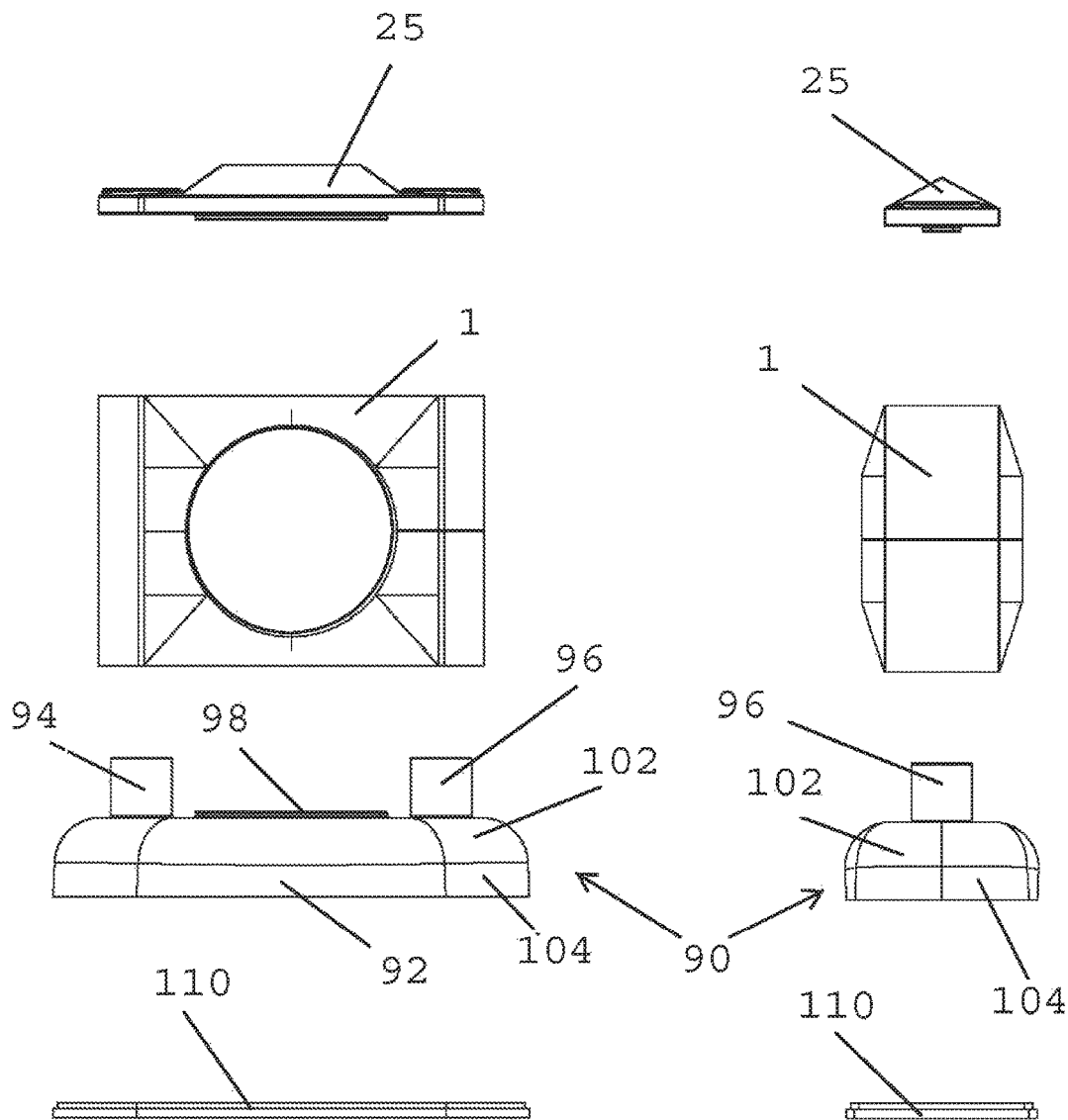
FIG. 10A is an exploded front elevation view of a typical block style tube and pipe hanger and the further embodiment of the anchor bracket of Applicant's invention.
FIG. 10B is an exploded side elevation view of a typical block style tube and pipe hanger and the further embodiment of the anchor bracket of Applicant's invention.

A front elevation view of the alignment of the attachment plate 25, the block style tube and pipe hanger 1, the anchor bracket 90 and the sealing washer 110 is shown in FIG. 10A and a side elevation view is shown in FIG. 10B. An assembled side elevation view of the bolts 21 inserted through the attachment plate 25, the block style tube and pipe hanger 1, the anchor bracket 90 and the sealing washer 110 is shown in FIG. 11A. In some embodiments, a threaded receiver or other fastener may be attached to the bolts 21 to secure the anchor bracket 90 to the block style tube and pipe hanger 1. As shown in a top view of the assembly in FIG. 11B and in a side elevation view in FIG. 11C, the pedestal 92 of the anchor bracket 90 extends out beyond the length and width of the block style tube and pipe hanger 1 to provide adequate support. A bottom view of the assembly as shown in FIG. 11D shows the widened opening through the sealing washer 110 to adequately surround and seal a variety of attachment fasteners that may have upper portions that extend from a panel 51 of various sizes.

As shown in FIG. 12A, the width W1 of the anchor bracket 90 may be wider than the width W2 of the block style tube and pipe hanger 1 to provide greater structural support particularly if the pipe hanger 1 is larger and longer extending further out from the anchor bracket 90 and panel 51. As shown in FIG. 12B, the outer diameter OD of the passage O is of a desired dimension with the length L of the block style tube and pipe hanger 1 extending a sufficient amount beyond the outer diameter OD of the passage O to accommodate the width of the bolts 21. The bolt holes 17 are properly dimensioned to allow the bolts 21 to freely be inserted through the block style tube and pipe hanger 1. The bolts 21 are selected to extend beyond the height H of the block style tube and pipe hanger 1 and the height PH of the anchor bracket 90 with a sufficient distance of roughly 1" to 3" beyond the base portion 104 of the pedestal 92 to sufficiently secure the block style tube and pipe hanger 1 and anchor bracket 90 to a panel 51 using a fastener. The pedestal height PH and the pedestal length PL as noted above are of a dimension to adequately surround and seal the attachment fastener that secures the pipe hanger 1 and anchor bracket 90 to a panel 51. As shown in a bottom view in FIG. 12C, the widened openings in the sealing washer 110 are wide enough for the upper portion of many varieties of fasteners to fit through the opening and be sealed within the pedestal 92 of the anchor bracket 90. Embodiments of the anchor bracket 90 may therefore be of any material to meet the requirements of a specific environment and of any size and dimension to accommodate the dimensions of the block style tube and pipe hanger 1 and the upper portion of a fastener that extends from a panel 51.

Figure 13:
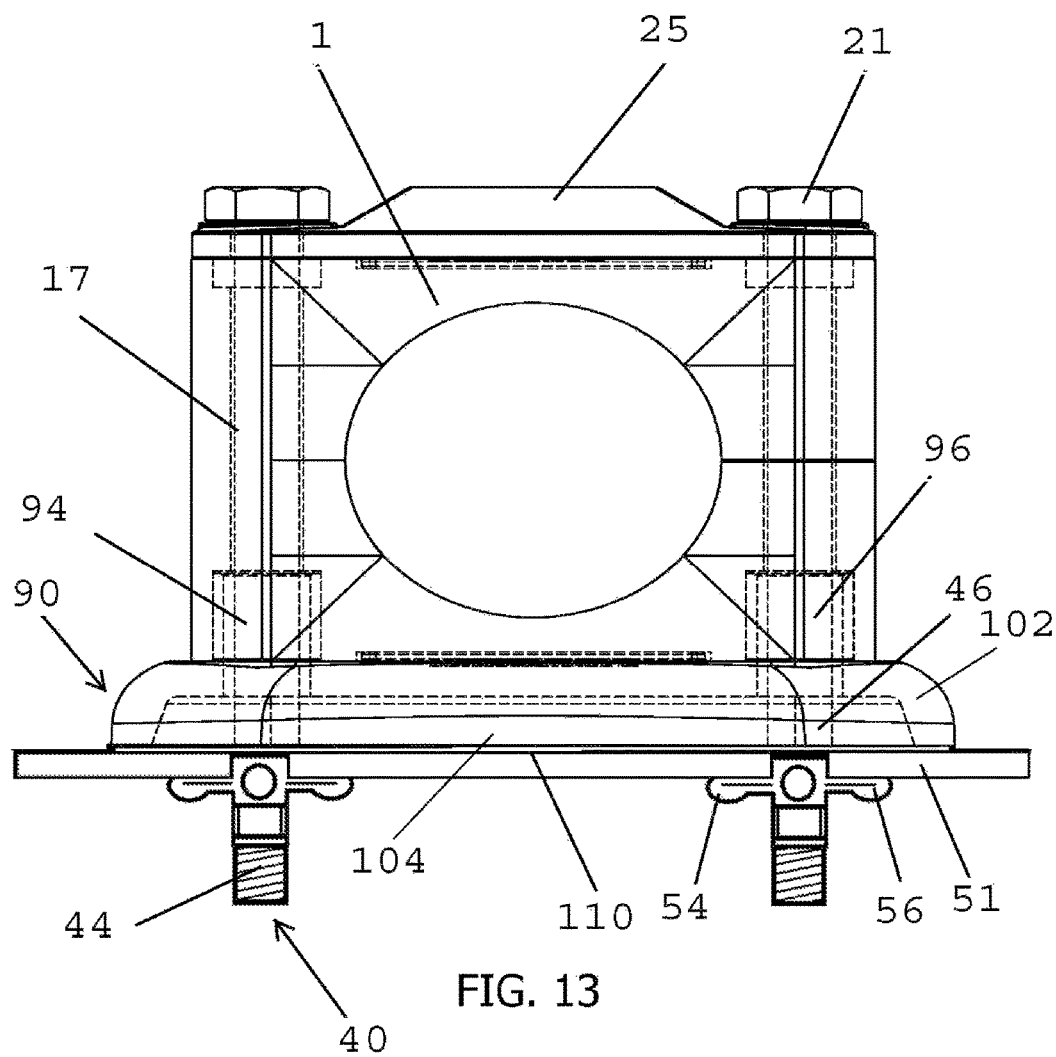
FIG. 13 is a side elevation view of a typical block style tube and pipe hanger and the further embodiment of the anchor bracket of Applicant's invention affixed to a panel.

As shown in FIG. 13, the toggle bolt 40 extends through the panel 51 with the internal bore 58 of upper portion formed as a threaded receiver for the bolt 21 to attached to the toggle bolt 40 to secure the block style tube and pipe hanger 1 and anchor bracket 90 to the panel 51. The sealing washer 110 may extend a short distance beyond the base portion 104 of the anchor bracket 90 to the surround the hex head 46 and sealing washer 48 of the toggle bolt 40 within the cavity of the pedestal 92 and seal the anchor bracket 90 to the panel 51 to protect the irregular surfaces of the toggle bolt 40 from caustic cleaning solutions and to prevent the buildup of dirt and bacteria. By using only two bolts to secure the block style tube and pipe hanger 1 and anchor bracket 90 to the panel 51, the overall footprint of the further embodiment of the anchor bracket 90 is smaller and the pedestal height PH may extend a shorter distance from the panel 51 to position a pipe within the pipe hanger 1 closer to the panel and thereby have the pipe take up less space within the clean room, sterile room, or other sanitary room. Using only two bolts also reduces the materials and costs and with less parts, makes the installation of the block style tube and pipe hanger 1 and anchor bracket 90 easier. Therefore, the further embodiment of the anchor bracket 90 uniquely provides for various varieties of fasteners or other attachment fixtures to secure the block style tube and pipe hanger 1 and anchor bracket 90 to the panel 51, has a smaller footprint, allows the pipe to be closer to the panel taking up less space within a room, is less costly and is easier to install.

While the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. A hygienically sealable anchor bracket for a ceiling, wall, floor, equipment frame or other paneled strata for block style pipe and tube hangers, said hygienically sealable anchor bracket comprising:
   a plurality of attachment fasteners for insertion through and securing to said ceiling, wall, floor, equipment frame, or other paneled strata, said attachment fastener having an internally threaded bore;
   an anchor bracket comprising:
   a pedestal having a cavity; and
   a plurality of receptacles extending out from the pedestal;
   a sealing washer; and
   wherein said anchor bracket is configured to be positioned to surround said secured plurality of attachment fasteners to form a seal to protect the irregular surfaces of an exposed upper portion of the plurality of attachment fasteners extending from said ceiling, wall, floor, equipment frame, or other paneled strata from caustic cleaning solutions and to prevent the buildup of dirt and bacteria; and
   a securing fastener passing through one of said plurality of receptacles to engage with one of said internally threaded bores on one of said plurality of attachment fasteners, securing said block style pipe and tube hangers for embracement with a diameter of a pipe or tube to said ceiling, wall, floor, equipment frame, or other paneled strata; and
   wherein said upper portions extending through said ceiling, wall, floor, equipment frame, or other paneled strata are formed as bolt heads and washers of various sizes; and
   the sealing washer having widened openings to surround and seal said upper portions of the plurality of attachment fasteners to said ceiling, wall, floor, equipment frame, or other paneled strata.

2. The hygienically sealable anchor bracket in accordance with claim 1 wherein the sealing washer is oval in shape.

3. The hygienically sealable anchor bracket in accordance with claim 1 wherein the pedestal is oval in shape.

4. The hygienically sealable anchor bracket in accordance with claim 1 wherein the pedestal comprises a curved outer wall and base portion.

5. The hygienically sealable anchor bracket in accordance with claim 1 wherein the pedestal comprises a recess; and a sealing washer for insertion in the recess.

6. The hygienically sealable anchor bracket in accordance with claim 1 comprising a single attachment plate.

7. The hygienically sealable anchor bracket in accordance with claim 1 comprising using only two bolts to assemble and secure the block style pipe and tube hanger and anchor bracket to said ceiling, wall, floor, equipment frame, or other paneled strata.

8. A hygienically sealable anchor bracket for a ceiling, wall, floor, equipment frame or other paneled strata for block style pipe and tube hangers, said hygienically sealable anchor bracket comprising:
   a plurality of toggle bolt assemblies for insertion through and securing to said ceiling, wall, floor, equipment frame, or other paneled strata, said toggle bolt having an internally threaded bore formed in a bolt head;
   an anchor bracket comprising:
   a pedestal having a cavity; and
   a plurality of receptacles extending out from the pedestal; and
   wherein said anchor bracket is configured to be positioned to surround said secured plurality of toggle bolt assemblies to form a seal to protect the irregular surfaces of said plurality of toggle bolt assemblies from caustic cleaning solutions and to prevent the buildup of dirt and bacteria;
   and a securing fastener passing through one of said plurality of receptacles is configured to engage with one of said internally threaded bores on said toggle bolt head, securing said block style pipe and tube hangers for embracement with a diameter of a pipe or tube to said ceiling, wall, floor, equipment frame, or other paneled strata.

9. The hygienically sealable anchor bracket in accordance with claim 8 comprising a sealing washer.

10. The hygienically sealable anchor bracket in accordance with claim 9 wherein the sealing washer is oval in shape.

11. The hygienically sealable anchor bracket in accordance with claim 9 wherein the sealing washer having widened openings configured to surround upper portions of the toggle bolt assemblies that extend from said ceiling, wall, floor, equipment frame, or other paneled strata, the upper portions formed in various configurations and sizes.

12. The hygienically sealable anchor bracket in accordance with claim 8 wherein the pedestal is oval in shape.

13. The hygienically sealable anchor bracket in accordance with claim 8 wherein the pedestal comprising a curved outer wall and base portion.

14. The hygienically sealable anchor bracket in accordance with claim 8 wherein the pedestal comprising a recess; and
    a sealing washer for insertion in the recess.

15. A method of hygienically sealing a plurality of attachment fasteners extending from a ceiling, wall, floor, equipment frame or other paneled strata to protect the irregular surfaces of said plurality of attachment fasteners from caustic cleaning solutions and prevent the buildup of dirt and bacteria, comprising:
    extending an upper portion of the attachment fastener having an internally threaded bore through said ceiling, wall, floor, equipment frame, or other paneled strata;
    securing said attachment fastener to said ceiling, wall, floor, equipment frame, or other paneled strata;
    aligning an anchor bracket having a pedestal and plurality of receptacles to surround and seal the upper portion of the attachment fastener to said ceiling, wall, floor, equipment frame, or other paneled strata to protect the irregular surfaces of said exposed upper portion from caustic cleaning solutions and to prevent the buildup of dirt and bacteria;
    inserting a securing fastener through said receptacle of said anchor bracket and said internally threaded bore of the attachment fastener;
    inserting a sealing washer in a recess at a base portion of the pedestal;
    surrounding and sealing said upper portion of the attachment fastener with a widened opening of the sealing washer; and
    securing said block style pipe and tube hangers for embracement with a diameter of a pipe or tube to said ceiling, wall, floor, equipment frame, or other paneled strata.

\* \* \* \* \*